United States Patent [19]

Ukihashi et al.

[11] 4,107,356

[45] Aug. 15, 1978

[54] METHOD OF POWDER LINING

[75] Inventors: Hiroshi Ukihashi, Tokyo; Tetsuya Uchino, Yokohama; Takeshi Abe, Yokohama; Nobuaki Kunii, Yokohama, all of Japan

[73] Assignee: Asahi Glass Company, Ltd., Tokyo, Japan

[21] Appl. No.: 622,456

[22] Filed: Oct. 15, 1975

[51] Int. Cl.$^2$ .......................... C08K 3/04; C08K 7/06
[52] U.S. Cl. .................................. 427/195; 106/307; 260/37 EP; 260/40 R; 260/42.17; 427/236
[58] Field of Search ............. 260/42.17, 37 EP, 40 R; 427/195; 106/307

[56] References Cited

U.S. PATENT DOCUMENTS

| | | |
|---|---|---|
| 3,412,062 | 11/1968 | Johnson et al. .................. 260/42.17 |
| 3,860,557 | 1/1975 | Millar et al. ....................... 260/42.28 |
| 3,967,004 | 6/1976 | Oda et al. .............................. 427/196 |

*Primary Examiner*—James H. Derrington
*Attorney, Agent, or Firm*—Oblon, Fisher, Spivak, McClelland & Maier

[57] ABSTRACT

A powder lining method which comprises coating a substrate with a synthetic resin powder containing 2 to 50 wt. % of a carbon fiber having a length of less than 1000 microns and subsequently baking. The use of a synthetic resin powder containing carbon fibers makes possible the preparation of significantly thicker linings in a single step than was possible previously.

10 Claims, No Drawings

METHOD OF POWDER LINING

BACKGROUND OF THE INVENTION

1. Field of the Invention

The present invention relates to an improved method of powder lining. More particularly, it relates to an improved method of powder lining where in a single step, or a multiplicity of steps, a uniform mixture of a synthetic resin powder and a specific carbon fiber, can be adhered onto a surface of a substrate, so as to attain a thick lining layer characterized by high mechanical strength.

2. Description of the Prior Art

Various lining methods, such as a sheet lining, dispersion lining, powder lining or the like, have been employed in the prior art. Preparation of a lining starting with a powder, however, has the advantages that no organic solvent is used and the adhesion of the lining layer to the substrate is excellent. Prior art powder lining methods include powder spraying, wherein a resin powder is sprayed onto a substrate, heated to a temperature higher than the melting point of the synthetic resin followed by subsequent baking of the coated layer; or electrostatic powder lining, wherein a resin powder is electrically charged and adhered onto a substrate by electrostatic attraction and then baked. In these conventional powder lining methods only thin layers can be formed in that if a thick lining is required, it is necessary to repeat the coating and baking steps several times. When the coating steps were repeated cracks were found to be easily formed in the lining layer due to stresses caused by the difference in thermal expansion between the synthetic resin layer and the substrate. Moreover, even though it is theoretically possible to obtain thick layers by the multiple application of the prior art techniques, in actuality in many of these techniques multiple applications was not feasible. For example, an ethylene-tetrafluoroethylene type copolymer is useful as an anticorrosive lining material, because of its high corrosion resistance and heat resistance. The thickness of the lining layer formed by the electrostatic powder lining of a ethylene-tetrafluoroethylene copolymer is about 100 - 150 microns. It is relatively difficult to repeat the coating to obtain a thicker lining in the conventional electrostatic powder lining, because of the electrical insulating characteristics of the first formed ethylene-tetrofluoroethylene copolymer layer. However the thickness of the layer formed by a single powder spraying step is about 100 - 300 microns. Despite the difficulty of multiple application, it is necessary to repeat the several coating-baking steps to attain a lining having a thickness of more than 500 microns, which is required for the corrosion resistance of lining layer to be satisfactory. In powder spraying the spray is conducted at a high temperature, because of this it is not desirable to repeat spraying operation.

There exists a need for a powder lining method which prepares relatively thick linings, having excellent mechanical properties in a single step which may, if desired, be repeated to prepare still thicker linings if desired.

SUMMARY OF THE INVENTION

Accordingly, it is one object of the present invention to provide a powder lining method which prepares a thick layer in one step using a powder having excellent flowability.

It is another object of the present invention to provide a method of powder lining which prepares a lining layer having excellent mechanical properties without the occurrence of stress cracking.

The objects of the invention are accomplished by adhering onto the surface of a substrate a synthetic resin powder containing 2 - 50 wt.% of carbon fibers, having a length of less than 1000 microns, uniformly mixed with the synthetic resin powder and baking it.

DESCRIPTION OF THE PREFERRED EMBODIMENTS

It is not known why the amount of a synthetic resin powder which adheres in a single step is increased by the addition of the specific carbon fibers of this invention. Without being bound by any particular theory it is believed that the increased amount of powder adhered to the substrate is a result of the high heat conductivity, electro conductivity and intertwining of the carbon fibers. This theory is based on our observations that the desired results cannot be attained by adding either graphite powder or glass fibers to the synthetic resin.

The carbon fibers should have a length of less than 1000 microns, preferably 20-500 microns, more preferably 150- microns. Any of the various known carbon fibers can be used in this invention. The carbon fibers can be fibrous materials or powdered fibrous materials formed by crushing fibers which contain more than 90 wt.% of carbon content prepared by carbonizing or graphitizing in a special atmosphere a fiber of an organic material such as rayon, polacrylonitrile, lignin type fiber, furfural and pitch. When the carbon fiber is longer than 1000 microns it is not possible to attain uniform mixing of the fiber with the synthetic resin and the flowability of the powder-fiber mixture is not satisfactory. It is essential that the carbon added be fibrous carbon as the desired results are not attained by adding an activated carbon powder or a graphite powder. The carbon fiber used in the invention has a length of less than 1000 microns, a diameter of 5 - 30 microns, preferably 8 - 15 microns, and a ratio of length to diameter of 2 - 100, preferably 5 - 20. Use of a carbon fiber having larger or smaller diameter decreases the flowability of the powder or impairs uniform mixing of the fiber and synthetic resin powder. When the ratio of length to diameter is too low, the fiber is powdery and the resulting carbon fiber-synthetic resin powder is not capable of forming a thick layer on a substrate in a single step. When the ratio of length to diameter is too high it is difficult to uniformly mix the synthetic resin powder and the fiber. In addition the resulting powder does not have the desired flowability. It is possible, however, to mix two or more types of carbon fibers having different lengths, diameters or ratios of length to diameter.

When the content of the carbon fiber is too high by weight of the total mixture of synthetic resin and fiber the adhesiveness or bonding strength of the lining layer to the substrate is decreased and the surface of the lining layer is rough. When the content of the carbon fiber is too low the fiber-synthetic resin powder is incapable of forming a thick layer on a substrate in a single addition. Accordingly, the content of the carbon fiber to the total mixture of synthetic resin powder and fiber is in the range of 2 - 50 wt.%, preferably 5 - 30 wt.%.

Synthetic resin powders of thermoplastic and thermosettable type resins can be used in the method of this invention. Suitable synthetic resins for use in this invention include thermoplastic resins such as tetrafluoroethylene-ethylene copolymers, trifluoroethylene-ethylene copolymers, ethylene-trifluorochloroethylene copolymers, vinylidenefluoroide polymers, trifluorochloroethylene polymers, ethylene polymers and mixture thereof; thermosettable resins such as epoxy resins, acrylate resins, unsaturated polyester resins and the like. The synthetic resin is selected depending upon the purpose the lining layer is to serve. For example when the lining layer must be heat and corrosion resistant, it is preferred to use a fluorine-containing melt processable polymer such as ethylene-tetrafluoroethylene copolymers, ethylene-trifluorochlorethylene copolymers, vinylidenefluoride polymers, tetrafluoroethylene-perfluorovinyl ether copolymers, tetrafluoroethylene-hexafluoropropylene copolymers, trifluorochloroethylene polymers and the like.

When synthetic resins having a high di-electric constant such as ethylene-tetrafluoroethylene copolymer, ethylene-trifluorochloroethylene copolymers, tetrafluoroethylene-hexafluoropropylene copolymers and the like are mixed with carbon fibers in accordance with this invention, the resulting resin-fiber powder is particularly superior for use in powder lining, as compared with powders not containing the carbon fibers. The preferred synthetic resins used in the method of this invention are fluorine-containing melt processable synthetic resins. Preferably, these resins have a volumetric flow rate of 10 – 300 mm$^3$/sec, more preferably 20 – 160 mm hu 3/sec.

The volumetric melt flow rate is determined as follows: 1 g of a sample of the copolymer is extruded through a nozzle having a diameter of 1 mm and a round of 2 mm under a predetermined pressure of 30 Kg/cm$^2$ at a predetermined temperature using a flow-tester. The volume of the molten sample extruded per unit time is shown as the volumetric melt flow rate and the unit is mm $^3$/sec. The predetermined temperature is a temperature within the temperature range at which the synthetic resin is moldable. That is, a temperature between the temperature at which melt flow begins and the temperature at which thermal decomposition begins, preferably a temperature near the temperature at which melt flow begins, i.e. the fluid initiation temperature. For example, the predetermined temperature is from 260° to 360° C for an ethylene-tetrafluoroethylene copolymer and from 220° to 330° C for an ethylene-trifluorochloroethylene copolymer.

The preferred synthetic resins used in the method of this invention are ethylene-tetrafluoroethylene copolymers having a molar ratio of tetrafluoroethylene to ethylene of 40 : 60 – 70 : 30, especially 45 : 55 – 60 : 40 or ethylene-trifluorochloro-ethylene copolymers having a molar ratio of trifluorochloroethylene to ethylene of 40 : 60 – 70 : 30, especially 45 : 55 – 60 : 40.

The synthetic resin powder used in the method of this invention has an average particle diameter of about 2 – 400 microns, preferably about 5 – 250 microns, more preferably 10 – 200 microns. When the particle diameter of the synthetic resin powder is too small, the powder exhibits poor flowability and it is not possible to obtain uniform adherence of the powder to the substrate. When the particle diameter of the synthetic resin powder is too large, the lining layer formed will not be of uniform thickness.

The average particle diameter is measured as follows: The synthetic resin powder is sieved to remove the particles which do not pass through the 150 mesh of a Tyler standard sieve. A particle size distribution curve is prepared by using Micromerograph manufactured by Franklin Electronics Co., Ltd. for the samples of synthetic resin powder which pass through the 150 mesh Tyler standard sieve. The particle diameter at 50% of the integrated weight percentage of the curve is the average particle diameter. It is preferred to use a synthetic resin powder having narrow particle size distribution, and a near spherical shape.

The bulk density of the synthetic resin powder is not critical, but it is usually in a range of 0.1 – 1.2 g/cm$^3$, preferably 0.3 – 0.8 g/cm$^3$ so as to form a uniform, smooth lining layer.

The synthetic resin powder preferably has an angle of repose of less than 50°, especially less than 45°, so as to give good powder flowability. The angle of repose is measured as follows:

The powder is flowed through a funnel having an aperture of 9 mm onto a disk having a diameter of 50 mm disposed 5 cm below the end of the funnel. Sufficient powder (about 100 ml) is passed through the funnel, so as to form a conical powder layer on the disk. The height of the conical powder layer (Hmm) is measured and the angle of repose ($\theta = \tan^{-1}$ (H/25) is calculated, (average value of three tests).

The powder is usually prepared by a crushing process. It is preferable to control the particle diameter, bulk density, the particle size distribution and the shape by the controlling conditions in the crushing process.

The most preferred synthetic resin powders are ethylene-tetrafluoroethylene copolymer powder or ethylene-trifluorochloroethylene copolymer powder each having particle diameters of 2 – 400 microns and bulk densities of 0.2 – 1.0 g/cm$^3$.

The synthetic resin-carbon fiber powder used in the method of this invention may also contain additives such as reinforcing materials, fillers, lubricants, stabilizers, pigments and others. Suitable additives may also be used to improve thermal stability, surface hardness and wear resistance, and non-tackiness of the lining layer.

When it is desired to prepare a lining layer havng a thickness of more than 500 microns by repeating the coating and baking step, the synthetic resin is kept at a high temperature for a long period of time. Accordingly, it is necessary to prevent the thermal deterioration of the synthetic resin. This is accomplished by the addition of a thermal stabilizer to the synthetic resin. For example, the thermal stability of the synthetic resin is improved by the addition of a small amount of $\alpha$-alumina or a copper compound e.g. Cu, CuCl$_2$ and Cu(NO$_3$)$_2$; whereby the thermal deterioration of the synthetic resin is prevented in the multiple coating-baking steps.

In the conventional powder spray method, a lining layer having a thickness of 200 – 300 microns is formed in a single coating-baking step; the coating-baking step is repeated to form a lining having the desired thickness. As the spraying is conducted at a temperature higher than the melting point of the resin there are various problems encountered in repeating the coating-baking steps.

In contrast, with the powder spray method of this invention it is possible to prepare a lining layer having a thickness of more than 500 microns in a single coating-baking step.

In the conventional electrostatic lining method, it is possible to spray at room temperature. However in a single coating-baking step the maximum lining layer thickness obtainable is 100 – 150 microns. Moreover, it is difficult to repeat the coating step.

In the electrostatic lining method of this invention, it is possible to prepare a lining layer having a thickness of more than 200 microns in a single coating-baking step, and, moreover, it is possible to repeat the coating step. Further, in the electrostatic lining method of this invention the thickness of the lining layer prepared in a single coating-baking step can be increased by pre-heating the substrate. For example, when using an ethylene-tetrafluoroethylene copolymer as the resin the substrate is preheated to about 200° C which is lower than the melting point of the resin, in this manner it is possible to obtain a thickness of more than 300 microns in a single coating-baking step.

The operating conditions and apparatus for adhering the synthetic resin-carbon fiber powder on the substrate and its the subsequenting baking step are not critical. Typically, those conditions employed in the conventional powder lining methods may be used. It is preferable, however, to select the optimum conditions, such as the preheat temperature of the substrate, spraying rate of the powder, feeding rate and charge of the powder in the electrostatic powder lining method, baking temperature etc. depending on the type of substrate and synthetic resin.

The temperature of the baking step is selected depending upon the type of synthetic resin which has been employed. Typically the baking temperature is higher than the fluid initiating temperature but below the thermal decomposition temperature of the synthetic resin. For example, ethylene-tetrafluoroethylene copolymers which have a fluid initiating temperature of about 250°–270° C and a thermal decomposition temperature of about 340° – 360° C are baked at 265° – 360° C, preferably 270° – 340° C; and ethylene-trifluorochloroethylene copolymers which have a fluid initiating temperature of about 220° – 260° C, in particular 230° – 250° C and a thermal decomposition temperature of about 310° – 350° C in particular 320° – 340° C are baked at temperatures of from 220° – 330° C, in particular 240° – 300° C. Other typical baking temperatures are about 200° – 280° C for vinylidenefluoride resins; about 180° – 250° C for polyethylene; and about 250° – 310° C for trichloroethylene.

When coating in accordance with the method of this invention there is formed a composite lining layer comprising the synthetic resin and the carbon fiber on the surface of the substrate. It is possible to form a lining layer having high stress cracking resistance and a thickness of more than 500 microns in a single step of the powder spraying method. In the electrostatic powder lining method, a lining layer having a thickness of more than 200 microns may be formed in a single coating baking step. If thicker lining layers are desired the coating-baking step may easily and effectively be repeated to prepare thicker linings.

Any of the substrates previously coated using the prior art powder lining methods may be coated using the method of this invention. The substrate typically may be a metal such as steel, iron, aluminum, stainless steel and the like, or a non-metal, such as glass and special ceramics, etc. The shape of the substrate is not critical and it may be in the form of plain plates, rods, tubes, hollow containers, special shapes and the like. The substrates coated in accordance with this invention may be used in electrical elements, mechanical parts, cooking implements, chemical apparatus, instruments, construction and the like.

It is preferable to pretreat the surface of the substrate by a conventional cleaning methods to remove dust from the surface of the substrate. The substrate may be subjected to mechanical surface treatments e.g,. a sand blast treatment or a chemical treatments e.g. an etching, if desired.

Having generally described the invention, a more complete understanding can be obtained by reference to certain specific examples, which are included for purposes of illustration only and are not intended to be limiting unless otherwise specified.

EXAMPLES 1 – 4 and COMPARATIVE EXAMPLES 1 – 7

An ethylene-tetrafluoroethylene copolymer powder having a molar ratio of tetrafluoroethylene to ethylene of 53 : 47, a volumetric melt flow rate of 70 mm$^3$/sec. at 300° C, a fluid initiating temperature of 270° C, a thermal decomposition initiating temperature of 350° C, an average particle diameter of 50 microns, a bulk density of 0.58 g/cm$^3$, and an angle of repose of 42° was used in these examples. The copolymer powder and a carbon fiber having a diameter of 10 microns and a length of 50 – 100 microns were admixed in a V-shape mixer and the mixture was fed into a 12 liter hopper having a metallic perforated plate at the bottom. Compressed air at 2 Kg/cm$^2$ (gauge) was fed from the bottom of the hopper to spray the mixture with air from a pipe connected to the upper part of the hopper onto the surface of the substrate which was preheated to 300° C. The substrate was a mild steel plate having a thickness of 6 mm, a length of 20 cm. After coating the baking was conducted at 300° C for 15 minutes. The conditions and thickness of the resulting lining layers are shown in Table 1.

For comparison, the results of the lining method using no carbon fiber or adding the other fillers are also shown in Table 1, in comparative examples 1– 7.

EXAMPLES 5 – 9 AND COMPARATIVE EXAMPLES 8 – 15

The ethylene-tetrafluoroethylene copolymer powder and the carbon fiber of Example 1 were used.

The mixture of Example 1 was electrostatically deposited on the surface of the mild steel plate under the conditions of a charged voltage of 75 KV, a powder feeding rate of 200 g/minute, a fluidized bed pressure of 20 Kg/cm$^2$, and a powder carrier air pressure of 1.8 Kg/cm$^2$ by an electrostatic sprayer "Stajet" manufactured by Sames. The substrate was not preheated. The coated product was baked at 300° C for 15 minutes to form the lining layer.

The conditions and thicknesses of the resulting lining layers are shown in Table 2.

For comparison, the results of the lining method using no carbon fiber or adding the other fillers are also shown in Table 2. The glass fiber, alumina, silica and graphite are the same as those of comparative examples 3– 7.

Table 1

| | Filler | | Repeat lining (times) | Thickness of lining layer (μ) | Note |
|---|---|---|---|---|---|
| | Type | Amount (wt. %) | | | |
| Comp. Ex. 1 | — | — | 1 | 200 | — |
| Comp. Ex. 2 | — | — | 2 | 400 | cracks |
| Ex. 1 | carbon fiber | 10 | 1 | 360 | — |
| Ex. 2 | carbon fiber | 10 | 2 | 650 | — |
| Ex. 3 | carbon fiber | 20 | 1 | 800 | — |
| Ex. 4 | carbon fiber | 20 | 2 | 1500 | — |
| Comp. Ex. 3 | glass fiber powder | 20 | 1 | 350 | bad |
| Comp. Ex. 4 | glass fiber (1) | 20 | 2 | 600 | flowability; uneven |
| Comp. Ex. 5 | alumina (2) | 20 | 2 | 300 | — |
| Comp. Ex. 6 | silica (3) | 20 | 2 | 800 | cracks |
| Comp. Ex. 7 | graphite (4) | 20 | 2 | 140 | — |

Note:
(1) diameter of 9 microns; length of 50 microns
(2) diameter of 16 microns
(3) diameter of 50 microns
(4) diameter of 9 microns Table 2

| | Filler | | Repeat lining (times) | Thickness of lining layer (μ) | Note |
|---|---|---|---|---|---|
| | Type | Amount (wt. %) | | | |
| Comp. Ex. 8 | — | — | 1 | 100 | — |
| Comp. Ex. 9 | — | — | 2 | 150 | — |
| Ex. 5 | carbon fiber | 10 | 1 | 210 | — |
| Ex. 6 | carbon fiber | 10 | 3 | 450 | — |
| Ex. 7 | carbon fiber | 20 | 1 | 220 | — |
| Ex. 8 | carbon fiber | 20 | 2 | 400 | — |
| Ex. 9 | carbon fiber | 20 | 3 | 600 | — |
| Comp. Ex. 10 | glass fiber | 20 | 1 | 80 | bad powder flowability; uneven |
| Comp. Ex. 11 | glass fiber | 20 | 2 | 120 | |
| Comp. Ex. 12 | alumina | 20 | 1 | 70 | — |
| Comp. Ex. 13 | " | 20 | 2 | 100 | — |
| Comp. Ex. 14 | silica | 20 | 2 | 130 | — |
| Comp. Ex. 15 | graphite | 20 | 2 | 70 | — |

EXAMPLES 10 – 15 AND COMPARATIVE EXAMPLES 16 – 21

The lining operation was conducted in accordance with the method of Example 5, except using either vinylidene-fluoride (PFV) polymer powder having an average diameter of 150 microns or ethylene-trifluorochloroethylene (PE-TFCE) copolymer powder having an average diameter of 50 microns, bulk density of 0.7 g/cm³ and an angle of repose of 40° instead of the ethylene-tetrafluoroethylene copolymer powder. For comparison, no carbon fiber was added in comparative example 16– 21. The conditions and thickness of the resulting lining layers are shown in Table 3.

TABLE 3

| | Type of synthetic resin | Amount of carbon fiber (wt.%) | Baking condition (° C) (min) | Repeat lining (times) | Thickness of lining layer (μ) |
|---|---|---|---|---|---|
| Comp. Ex. 16 | PFV | — | 260 × 15 | 1 | 100 |
| Comp. Ex. 17 | " | — | " | 2 | 210 |
| Comp. Ex. 18 | " | — | " | 4 | 440 |
| Comp. Ex. 19 | PE-TFCE | — | 270 × 15 | 1 | 110 |
| Comp. Ex. 20 | " | — | " | 2 | 200 |
| Comp. Ex. 21 | " | — | " | 4 | 420 |
| Ex. 10 | PFV | 20 | 260 × 15 | 1 | 220 |
| Ex. 11 | " | 20 | " | 2 | 440 |
| Ex. 12 | " | 20 | " | 4 | 800 |
| Ex. 13 | PE-TFCE | 20 | 270 × 15 | 1 | 200 |
| Ex. 14 | " | 20 | " | 2 | 420 |
| Ex. 15 | " | 20 | " | 4 | 630 |

Note:
PFV: vinylidenefluoride polymer
PE-TFCE: ethylene-trifluorochloroethylene copolymer having a molar ratio of trifluorochloroethylene to ethylene of 50:50 and a volumetric melt flow rate of 100 mm³/sec.

In the powder lining methods of the examples fluorine type melt processable polymers have been illustrated. Similar effects can be attained by using other polymer powders.

Having now fully described the invention, it will be apparent to one or ordinary skill in the art that many changes and modifications can be made thereto without departing from the spirit or scope of the invention as set forth herin.

What is claimed as new and intended to be covered by Letters Patent is:

1. In a powder lining process which comprises coating a synthetic resin powder onto a substrate and baking the adhered powder and substrate the improvement which comprises, coating onto said substrate a fluorine-containing melt processable synthetic resin powder having a bulk density of 0.1 to 1.2 gms/cm³ and an average particle diameter of 2–400 microns which contains carbon fibers having a length of less than 1000 microns, a diameter of 5–30 microns and a length to diameter ratio of 2–100 wherein the content of carbon fiber in the total mixture of synthetic resin powder and carbon fiber is from 2 to 50 wt.%.

2. In the powder lining process of claim 1, the synthetic resin powder is ethylene-tetrafluoroethylene copolymer, ethylene-trifluorochloroethylene copolymer, vinylidenefluoride polymer, tetrafluoroethylene-perfluorovinyl ether copolymer, tetrafluoroethylene-hexafluoropropylene copolymer or trifluorochloroethylene polymer.

3. In the powder lining process of claim 1, the synthetic resin powder is ethylene-trifluorochloroethylene copolymer powder having molar ratio of trifluorochloroethylene to ethylene of 40 : 60 – 70 : 30, and a bulk density of 0.2 – 1.0 g/cm³.

4. In the powder lining process of claim 1, the synthetic resin powder is ethylene-tetrafluoroethylene copolymer powder having a molar ratio of tetrafluoroethylene to ethylene to ethylene of 40 : 60 – 70 : 30 ; and a bulk density of 0.2 – 1.0 g/cm³.

5. In the powder lining process of claim 1, the synthetic resin powder is a fluorine containing melt processable resin having a bulk density of 0.3 – 0.8 g/cm³, a particle diameter of 5 – 250 microns and an angle of respose of less than 50°.

6. In the powder lining process of claim 1, wherein the substrate is heated to higher temperature than the melting point of the synthetic resin powder.

7. In the powder lining process of claim 1, wherein a thermal stabilizer is added to the mixture of synthetic resin and carbon fibers.

8. In the powder lining process of claim 1, wherein the carbon fibers have a diameter of 8-15 microns and a length to diameter ratio of 5 – 20 and the content of carbon fiber to the total mixture of carbon fiber and synthetic resin is from 5 – 30 wt.%.

9. A powder which comprises a fluorine-containing melt processable resin powder having a bulk density of 0.1 to 1.2 gms/cm$^3$ and an average particle diameter of 2–400 microns and 2–50 wt.% of carbon fibers having a length of less than 1000 microns, a diameter of 5–30 microns and a length diameter ratio of 2–100.

10. The powder of claim 9 wherein the synthetic resin powder has a bulk density of 0.3 to 0.8 g/cm$^3$, a particle diameter of 5 – 250 microns and an angle of repose of less than 50°; and the carbon fibers have a diameter of 8 – 15 microns, a length to diameter ratio of 5 – 20 and the content of carbon fiber in the total mixture of synthetic resin and carbon fiber is from 5 to 30 wt.%.

* * * * *